UNITED STATES PATENT OFFICE.

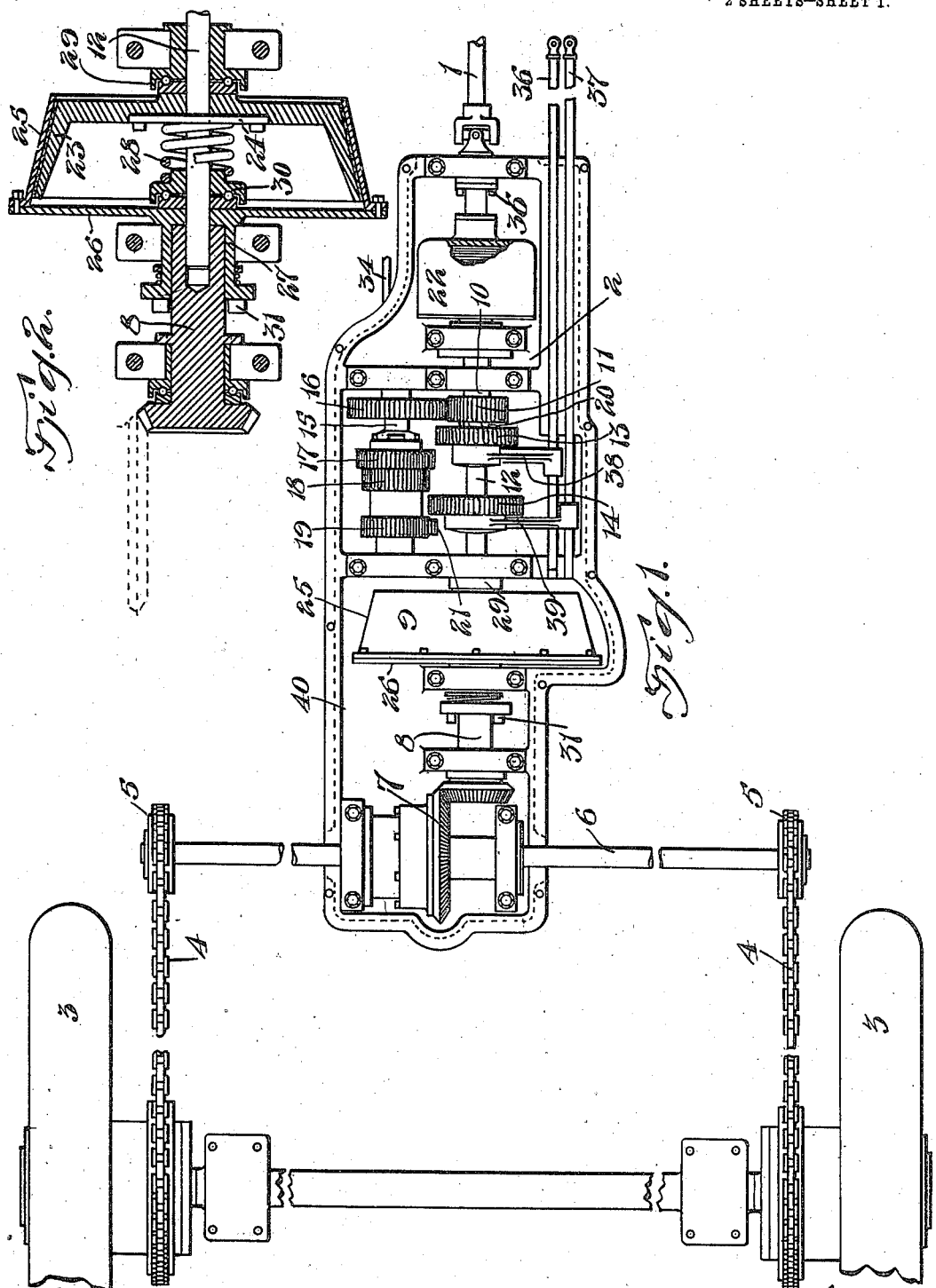

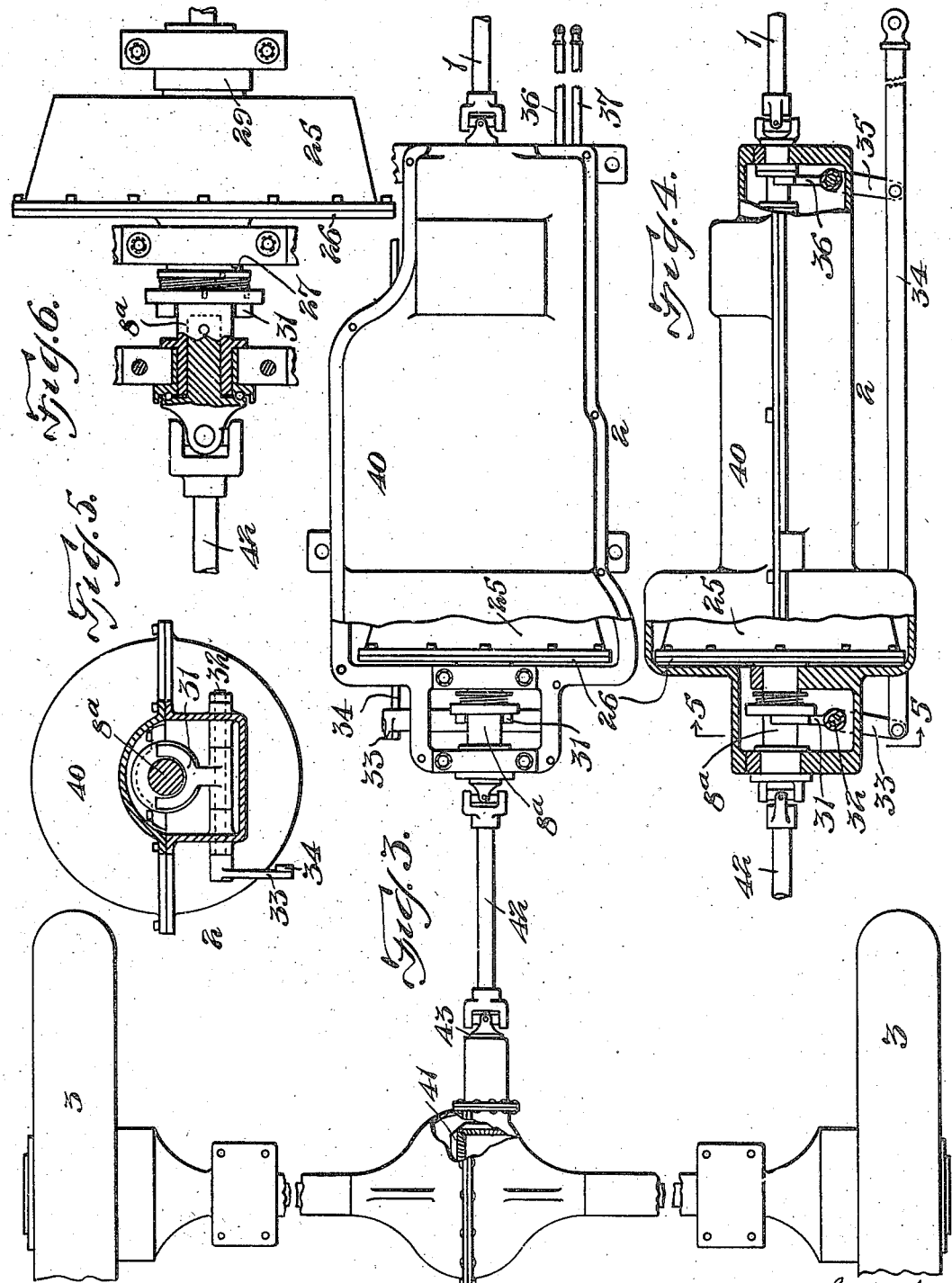

JOHN ECKHARD, OF BOSTON, MASSACHUSETTS.

DRIVING MECHANISM FOR MOTOR-VEHICLES.

1,011,174.  Specification of Letters Patent.  Patented Dec. 12, 1911.

Application filed February 8, 1911.  Serial No. 607,273.

*To all whom it may concern:*

Be it known that I, JOHN ECKHARD, of Boston, in the county of Suffolk and State of Massachusetts, have invented certain new and useful Improvements in Driving Mechanism for Motor-Vehicles, of which the following is a specification.

The present invention relates to an improvement in the mechanism of a motor-driven vehicle by which power is carried from the motor to the traction wheels.

More particularly it relates to motor trucks and other heavy and ponderous automobiles of which the motive power is furnished by an internal combustion engine, and in which also the variations of speed and power are effected by shifting one or more sliding gears or clutches. The mechanisms of this character most commonly used in heavy motor vehicles consist of gearing of which one or more members may slide into mesh with different gears, or in which are provided positive driving jaw clutches, or internal and external gear clutches, or any other positive disengageable couplings connectible and disconnectible with each other, so as to increase or diminish the speed and tractive force of the driving road wheels. In vehicles of this nature, particularly those of high power and great weight, much difficulty has been experienced on account of the difficulty of bringing the relatively movable gears into mesh without stripping their teeth, and in fact under even the best conditions the teeth of these gears are very rapidly and seriously worn away at those ends which strike together when they are first drawn into mesh. This is due to the fact that in changing the gears while the vehicle is in motion the momentum of the gears must be overcome when those which are to be meshed are running at different speeds, and the resistance to this momentum or inertia is borne wholly in the first instance by the ends of the teeth which first come into engagement. Thus the ends of the teeth are subject to severe strains and are rapidly worn away under the best conditions, while under unfavorable conditions the teeth are entirely stripped off.

The object of my invention is to diminish the amount of inertia or momentum to be overcome in changing the gears. This is effected by disconnecting the transmission mechanism from both the driving shaft and the shaft which transmits the power to the traction wheels when a change is made. Heretofore it has been the practice to provide a clutch between the motor and the transmission mechanism by which the latter may be disconnected for this purpose, but the connection of a part of the transmission mechanism with the traction wheels has always been continued, and as a consequence it has been necessary in shifting a gear into mesh with another gear or traveling positive clutch members into connection with complemental members running at a higher or lower speed, to overcome the inertia or momentum of the entire mechanism, except a few of the lighter parts thereof. As the parts which require to be slowed or speeded include a heavy shaft and massive gears, weighing many pounds in large vehicles, the strain borne by the tooth ends, which are beveled to assist bringing them into mesh, is very great. My invention removes this necessity and puts the transmission mechanism in such a condition that only the inertia of a few light parts need be overcome in changing speed. The manner in which I accomplish this object is described in full in the following specification and illustrated in the accompanying drawings, in which, Figure 1 represents a plan view of the power-transmitting mechanism of a motor-driven vehicle. Fig. 2 is a sectional view of a form of clutch which I find suitable for making detachable connection between the transmission mechanism and the traction wheels, such clutch being one out of the many diverse types which might be employed. Fig. 3 is a plan view similar to Fig. 1, but showing the cover of the transmission box applied and illustrating a different mode of carrying the power to the traction wheels. Fig. 4 is a side elevation of the transmission case, parts thereof being broken away. Fig. 5 is a cross-sectional elevation on line 5—5 of Fig. 4. Fig. 6 is an elevation of the clutch or coupling shown in Fig. 3.

The same reference characters indicate the same parts in all the figures.

Referring to the drawings 1 represents a shaft which is driven by the motor and constitutes in the combination hereinafter described and claimed the driving member or driving element.

2 represents the transmission mechanism as a whole.

3 represents two road wheels which serve as driving wheels, which wheels are connected with the transmission mechanism by chains 4, sprockets 5 on a shaft 6, differential gearing 7, a shaft 8 and a clutch or coupling 9. The last mentioned connections which drive the traction wheels may be called the tractor mechanism and the driving wheels the tractor elements.

The transmission gearing here shown is one of the many types in use in motor vehicles and is represented here as merely illustrative of a possible type of transmission which may be used, and not as being intended to limit me to the use of any particular type of such mechanism. In order to make the invention understood I must describe this mechanism in detail, but I wish to make it clearly understood that such detailed description cannot be taken as an indication that I limit my invention to this specific mechanism. Instead I reserve the right to employ any type of mechanism, whether the same includes sliding gears, positive jaw clutches, external and internal gear clutches, or any other kind of disengageable couplings the parts of which are adapted to engage and disengage from complemental clutch parts. The mechanism shown consists of a shaft 10 which is driven by the motor shaft through a coupling to be described, and on which is keyed a gear 11, a second shaft 12 in alinement with shaft 10 on which are slidingly mounted gears 13 and 14, and a counter-shaft 15 to which are secured gears 16, 17, 18 and 19. The gears 13 and 14 are splined or otherwise so engaged with shaft 12, that, although they may slide endwise thereon, they cannot rotate independently thereon. Conveniently the shaft 12 is squared and the gears are made to fit it. When the transmission mechanism is in the neutral position, gears 13 and 14 are both out of mesh and the shaft 12 remains stationary, although the shafts 10 and 15 with the gears thereon may be in rotation. For obtaining different speeds the gear 13 may be put in mesh with 17 or directly with a clutch 20 between it and the gear 11, and when 13 is out of mesh either with 17 or with the clutch, gear 14 may be engaged with either the gear 18 or an idler pinion 21 meshing with 19, the latter pinion being provided for reversing. Thus three different speeds in one direction and reversed rotation may be given to the shaft 12 and transmitted therefrom to the tractor mechanism. Prior to shifting the gears, this mechanism is disconnected both from the driving element and from the tractor mechanism, and when the shifting is completed, the connection is again made. Thus between the driving element and the transmission mechanism is a coupling 22, and between the transmission mechanism and the tractor mechanism is a second coupling 9 which has already been mentioned. These couplings may be of any character suitable for the purpose, such as clutches of any of the known types, or other detachable couplings. For the purpose of illustration I have shown the coupling 22 as a multiple disk clutch of familiar design and the coupling 9 as a cone clutch. The latter is illustrated in detail and consists of a conical head 23 secured to the shaft 12 by any suitable means such as a flange 24 and bolts or a key, etc., and a shell 25 surrounding the head and slidingly mounted upon the shaft section 8. For thus mounting the shell it is secured to a disk 26 which has a sleeve 27 surrounding shaft 8 and movable endwise thereon, being held against rotation. The adjacent faces of the conical head and shell are provided with frictional material and are held in contact by a spring 28, the end thrust of which is taken by anti-friction ball bearings 29 and 30. Disconnection of the clutch is effected by a lever 31, shown in Figs. 4 and 5, which has a forked end embracing shaft 8 and bearing against a flange on the sleeve 27. This clutch-shifting arm is secured on a rock shaft 32 carrying arm 33 to which is pivoted a link or operating rod 34 connected also to an arm 35 which operates a shifter 36 for disconnecting the clutch 22. The rod 34 is designed to be joined to one of the levers or treadles which are arranged within reach of the hand or foot of the driver. The sliding gears are also operated in the usual way through rods 36 and 37 connected to holders 38 and 39 by which the gears 13 and 14 respectively are carried.

The transmission gearing and couplings are inclosed in a box or case 40 made dust-proof in the usual way. In the driving mechanism shown in Fig. 1 the differential gearing 7 is also inclosed in this case.

In Fig. 3 another of the common forms of tractor mechanism is shown to illustrate the manner of applying my invention thereto. In this form of the invention a differential gearing 41 is connected directly with the axles of the road wheels and power is delivered thereto from the shaft $8^a$ through a floating shaft 42 connected by universal joints with the shaft 8ᵃ and a shaft 43 supported by the axle housing and carrying the driving pinion of the differential gearing.

Prior to making a shift of the gears to change the speed both clutches or couplings 9 and 22 are disconnected at the same time, thereby leaving the shafts 10 and 12 free. It is then possible to shift either sliding gear into mesh with a complemental gear running at a different speed, without imposing great strain upon the teeth of either gear, for the reason that it is not necessary to overcome much momentum or inertia in bringing these gears to the same speed, since both shafts 10 and 12, with the gears upon them, rotate free and only the momentum of the lighter of these shafts and gears need be overcome. In changing the gears without disconnecting the coupling 9 the entire momentum of the countershaft 15 with all the gears secured thereto would need to be overcome as well, this being due to the fact that as long as the shaft 12 is in connection with the tractor mechanism, and the vehicle is in motion, such shaft is positively driven with all the power due to the weight and speed of the entire vehicle.

It will be readily seen that by my invention, which secures isolation of the transmission mechanism from both the driving and driven elements, the accommodation of the gears to the speed of each other when brought into mesh may be made with very little resistance, with slight wear on the ends of the teeth which first engage, and with absolutely no danger of stripping the teeth of the gears. The transmission mechanism can be brought to rest instantly, or reduced to any speed required by the will of the operator by the use of brakes working automatically under the control of the operator when the gears are shifted, as shown in a co-pending application filed by me. Another advantage due to my invention is that the teeth of the changeable gears may be beveled to a sharp edge at their ends so that they may be shifted into mesh in any position, even if the teeth of the two gears are not in perfect alinement. This is made possible by the fact that the gears are free when the vehicle is in motion as well as when it is standing still, and that there is no such tendency to wear off and break the sharp beveled edges of the tooth ends that existed before my invention was made.

I claim,—

1. A driving mechanism for motor vehicles, comprising a driving shaft, transmission mechanism including parallel shafts and intermeshing gears, a clutch between said driving shaft and transmission mechanism, a clutch member mounted on the end of one of the shafts of the transmission mechanism, a driven shaft in line with the last-named shaft, a complemental clutch member on the driven shaft adjacent to said first-named clutch member, one of said clutch members being movable on its shaft into and out of engagement with the other member, a bearing for the driven shaft, and a second bearing supporting said complemental clutch member.

2. In an automobile transmission mechanism the combination of the driving road wheels, a differential gearing for applying power to the road wheels, a driven shaft, a bevel gear on the end of said shaft, meshing with and driving said differential gearing, a bearing for such shaft close beside the bevel gear, a clutch member consisting of a disk having a hub and a conical shell, said hub being mounted slidingly and non-rotatively on the shaft, a bearing surrounding the hub, a transmission shaft in line with the first-named shaft, a clutch cone secured upon said transmission shaft and contained within said shell, means for yieldingly forcing the first-named clutch member axially to engage its shell with the face of the cone, and means for applying power to said transmission shaft.

3. In an automobile driving mechanism, the combination of two shafts in alinement, one of said shafts having an extension entering an axial recess in the other, the latter shaft having a squared portion surrounding such extension, and both shafts being held against axial movement, a clutch member having a squared hub surrounding the squared portion of the second shaft and movable longitudinally thereon, a bevel gear secured to the end of the second shaft, a bearing surrounding the second shaft near the bevel gear, a second bearing surrounding the hub of the said clutch member, a clutch cone secured to the first-named shaft, and a spring interposed between the clutch cone and the said clutch member, said member consisting of a disk and a conical shell secured to the disk and surrounding the clutch cone, and being pressed by the spring into engagement with the conical surface of the latter.

4. An automobile transmission mechanism, comprising a driving shaft, transmission mechanism including a plurality of shafts and gears mounted thereon, one of the shafts of the transmission mechanism being a delivery shaft, a clutch between the driving shaft and transmission mechanism, a driven shaft in alinement with the delivery shaft of the transmission mechanism, a bevel gear on the end of said driven shaft remote from the delivery shaft, a clutch cone secured to the delivery shaft adjacent to the driven shaft, a complemental clutch member having a hub mounted slidingly and non-rotatively on the driven shaft and having a conical shell surrounding the clutch cone, yielding means interposed between the clutch cone and complemental clutch member arranged to move the latter in such a manner as to press the conical shell against the face of the cone, a bearing for the driven shaft, and a bearing for the complemental clutch member whereby the latter is retained in direct alinement with the cone and is prevented from being displaced by side thrust of the driven shaft.

In testimony whereof I have affixed my signature, in presence of two witnesses.

JOHN ECKHARD.

Witnesses:
A. H. BROWN,
P. W. PEZZETTI.